United States Patent
Hamada et al.

(10) Patent No.: US 10,110,021 B2
(45) Date of Patent: Oct. 23, 2018

(54) BALANCING DEVICE AND ELECTRICAL STORAGE DEVICE

(71) Applicant: FDK Corporation, Tokyo (JP)

(72) Inventors: Kenji Hamada, Tokyo (JP); Masatsuru Miyazaki, Tokyo (JP)

(73) Assignee: FDK Corporation, Tokyo (JP)

( * ) Notice: Subject to any disclaimer, the term of this patent is extended or adjusted under 35 U.S.C. 154(b) by 429 days.

(21) Appl. No.: 14/761,516

(22) PCT Filed: Jan. 21, 2014

(86) PCT No.: PCT/JP2014/051083
§ 371 (c)(1),
(2) Date: Jul. 16, 2015

(87) PCT Pub. No.: WO2014/115714
PCT Pub. Date: Jul. 31, 2014

(65) Prior Publication Data
US 2015/0326041 A1   Nov. 12, 2015

(30) Foreign Application Priority Data
Jan. 25, 2013  (JP) ................................ 2013-012594

(51) Int. Cl.
*H02J 7/00*       (2006.01)
*H02J 7/14*       (2006.01)
(Continued)

(52) U.S. Cl.
CPC ......... *H02J 7/0019* (2013.01); *B60L 11/1816* (2013.01); *B60L 11/1861* (2013.01);
(Continued)

(58) Field of Classification Search
USPC ........ 320/116, 118, 103, 112, 119, 107, 117, 320/120, 121, 126, 134, 155, 132, 114;
(Continued)

(56) References Cited

U.S. PATENT DOCUMENTS

| | | | |
|---|---|---|---|
| 8,896,315 B1* | 11/2014 | Davies | H02J 7/0016 320/117 |
| 2004/0263119 A1* | 12/2004 | Meyer | H02J 7/0004 320/116 |

(Continued)

FOREIGN PATENT DOCUMENTS

| | | |
|---|---|---|
| JP | 11-176483 | 7/1999 |
| JP | 2001-185229 A | 7/2001 |

(Continued)

OTHER PUBLICATIONS

International Search Report for PCT/JP2014/051083, ISA/JP, dated Apr. 28, 2014.

*Primary Examiner* — Alexis Pacheco
(74) *Attorney, Agent, or Firm* — Harness, Dickey & Pierce, P.L.C.

(57) ABSTRACT

There is provided a balancing device that equalizes voltages between storage cells of a battery composed of a plurality of series-connected storage cells or voltages between electrical storage modules composed of a plurality of series-connected storage cells of the battery. The balancing device equalizes voltages between the energy storage modules by transferring electric power between the electrical storage modules through an element to which all of the electrical storage modules are connected, the transferring being realized by on-off control of current supply to each of the electrical storage modules, the on-off control being performed with a first duty cycle. Further, the balancing device introduces a period in which the on-off control is performed with a second duty cycle, the second duty cycle being different from the first duty cycle. Furthermore, the balancing device measures a voltage applied to each of the capacitance elements C1 and C2 which connect between the terminals of the electrical storage modules respectively. Furthermore, the balancing device determines the presence of an open circuit in lines which connect the capacitance elements C1 and C2 and the electrical storage modules, the determination being (Continued)

performed based on change of the voltages during the period which are applied to the capacitance elements C1 and C2.

6 Claims, 7 Drawing Sheets

(51) Int. Cl.
*H01M 10/46* (2006.01)
*B60L 11/18* (2006.01)
*H01M 10/44* (2006.01)
*H01M 10/42* (2006.01)

(52) U.S. Cl.
CPC ....... *B60L 11/1866* (2013.01); *H01M 10/425* (2013.01); *H01M 10/44* (2013.01); *H01M 10/46* (2013.01); *H02J 7/0016* (2013.01); *H02J 7/0021* (2013.01); *H01M 2010/4271* (2013.01)

(58) Field of Classification Search
USPC .......................................... 324/434, 426, 433
See application file for complete search history.

(56) References Cited

U.S. PATENT DOCUMENTS

| | | | | |
|---|---|---|---|---|
| 2009/0140693 | A1* | 6/2009 | Johnson, Jr. | H02J 7/0016 320/116 |
| 2010/0327807 | A1* | 12/2010 | Kikinis | H02J 7/0016 320/116 |
| 2012/0025769 | A1* | 2/2012 | Kikuchi | B60L 3/0046 320/118 |
| 2012/0313562 | A1* | 12/2012 | Murao | B60L 3/0046 318/139 |
| 2013/0088202 | A1 | 4/2013 | Kamata et al. | |
| 2014/0111145 | A1* | 4/2014 | Mitsuda | B60L 11/14 320/107 |
| 2014/0225622 | A1* | 8/2014 | Kudo | B60L 3/0046 324/433 |

FOREIGN PATENT DOCUMENTS

| | | |
|---|---|---|
| JP | 2010-228523 A | 10/2010 |
| JP | 2013-085354 A | 5/2013 |

* cited by examiner

BALANCING DEVICE AND ELECTRICAL STORAGE DEVICE

CROSS-REFERENCE TO RELATED APPLICATIONS

This application is a 371 U.S. National Stage of International Application No. PCT/JP2014/051083, filed on Jan. 21, 2014, which claims the benefit of and priority to Japanese Patent Application No. 2013-012594, filed on Jan. 25, 2013. The disclosures of the above applications are incorporated herein by reference.

TECHNICAL FIELD

The invention relates to a balancing device and an electrical storage device that equalize voltages between storage cells of a battery composed of a plurality of series-connected storage cells or voltages between electrical storage modules composed of a plurality of series-connected storage cells of the battery.

BACKGROUND ART

In a battery in which a plurality of storage cells are connected in series, for preventing life reduction and deterioration of discharge capability, it is necessary to suppress variation in voltages (electromotive force) between the storage cells. In particular, in a battery composed of many storage cells, such as an electrical storage device used in electric-powered cars or the like, it is necessary to tightly suppress the variation in voltages between storage cells.

As a system which equalizes the voltages between storage cells, for example, Patent Literature 1 discloses a balancing method as follows: one end of an inductor L is connected to the junction point of series-connected secondary batteries B1 and B2, and the voltage of the battery B1 and the voltage of the battery B2 are equalized by performing during an appropriate period an operation in which a first mode in which current flows in a first closed circuit and a second mode in which current flows in a second closed circuit alternate at short intervals (switching operation); the first closed circuit is formed by connecting the other end of the inductor L to the other end of the battery B1, and the second closed circuit is formed by connecting the other end of the inductor L to the other end of the battery B2 (hereinafter the balancing method disclosed in Patent Literature 1 is referred to as a converter-type method).

Patent Literature 2 discloses assembled cells used for a device such as a notebook computer, the assembled cells including on-off controlled converter circuits and a current control circuit for the purposes of reducing loss of the assembled cells under low load current and cell balancing. Each of the converter circuits is connected in series with a cell, and the input of the converter circuit is the output voltage of the cell. And the output of the cell is connected so that the cell will have been charged. The current control circuit increases or decreases a primary current depending on a load current (hereinafter the balancing method disclosed in Patent Literature 2 is referred to as a transformer-type method).

CITATION LIST

Patent Literature

[Patent Literature 1] Japanese Patent Application Laid-open Publication No. 2001-185229

[Patent Literature 2] Japanese Patent Application Laid-open Publication No. 11-176483

SUMMARY OF INVENTION

Technical Problem

FIG. 6 shows a converter-type balancing circuit 6, which is an example of a balancing device for balancing the storage cells of a battery. As shown in FIG. 6, a battery 3 is composed of storage cells B1 and B2 which are connected in series. To each of the positive and negative terminals 31 and 32 of the battery 3, any of the follow items is connected: a current source which supplies charging current to the battery 3 (e.g. a charger, a power-regenerative circuit) or a load which uses electric power of the battery 3 (e.g. a motor, customers' load, an electronic circuit).

To the line which connects the negative electrode of the storage cell B1 and the positive electrode of the storage cell B2, one end of an inductor L is connected. On the line which connects the other end of the inductor L and the positive electrode of the storage cell B1, a switching element S1 is included. On the line which connects the other end of the inductor L and the negative electrode of the storage cell B2, a switching element S2 is included.

The switching elements S1 and S2 are composed of, for example, Metal-Oxide-Semiconductor Field-Effect Transistors (MOSFET). The switching elements S1 and S2 operate according to gate drivers D1 and D2 in a complementary manner such that one of the switching elements is OFF when the other switching element is ON, the gate drivers D1 and D2 being controlled by control signals $\varphi 1$ and $\varphi 2$ which are generated by a control circuit 30.

As shown in FIG. 6, a capacitance element C1 is placed between one end of the inductor L and the positive electrode of the storage cell B1, and a capacitance element C2 is placed between one end of the inductor L and the negative electrode of the storage cell B2. The capacitance elements C1 and C2 are provided for the following purposes: reducing noise which is caused by on-off operation of the switching elements; dampening voltage change which occurs in the storage cells B1 and B2 due to switching; or the like. If the switching elements S1 and S2 are composed of MOSFETs, the capacitance elements C1 and C2 may be substituted by the stray capacitance of the switching elements S1 and S2.

In a balancing circuit having the foregoing configuration, a control circuit 10 controls on-off states of the switching elements S1 and S2 according to control signals with a certain duty cycle so that the switching elements S1 and S2 are always in different on-off state from each other. Thus, electric power is transferred between the storage cell B1 and the storage cell B2, and the voltages are equalized between the storage cell B1 and the storage cell B2.

The control circuit 10 monitors in real time the voltage of each of the storage cells B1 and B2 (e.g. the voltage between junction points J4 and J3 and the voltage between junction points 33 and 35 in FIG. 6) using a voltage sensor (e.g. a voltmeter). When the control circuit 10 notices that the voltages of the storage cells B1 and B2 are substantially the same (cell balance is sufficiently ensured), the control circuit 10 stops the switching operation of the switching elements S1 and S2.

Unfortunately, in a balancing circuit 6 having the foregoing configuration, even if an open circuit occurs, for example, at an open point 71 of FIG. 7, the control circuit 10 cannot detect that an open circuit occurs at the open point 71. The reason is that there is little change of the potential of the junction point 34 because the storage cell B2 supplies energy towards the capacitance element C1 during the on-off control operation. The balancing circuit 6 subsequently continues the on-off control, and this may increase variation in the voltages between the storage cells B1 and B2. The same is true for cases in which an open circuit occurs, for example, on the line which connects the negative electrode of the storage cell B1 to the junction point 33.

The invention has been made in view of the foregoing recognition and an advantage thereof is to provide a balancing device and an electrical storage device which are capable of surely detecting an open circuit which occurs in the circuit.

Solution to Problem

An aspect of the invention to achieve the above advantage is a balancing device that equalizes voltages between storage cells of a battery composed of a plurality of series-connected storage cells or voltages between electrical storage modules composed of a plurality of series-connected storage cells of the battery, the balancing device including: a switching control section that equalizes voltages between the electrical storage modules by transferring electric power between the electrical storage modules through an element to which all of the electrical storage modules are connected, the transferring being realized by on-off control of current supply to each of the electrical storage modules, the on-off control being performed with a first duty cycle; a duty-cycle control section that introduces a period in which the on-off control is performed with a second duty cycle, the second duty cycle being different from the first duty cycle; a voltage measurement section that measures a voltage applied to a capacitance element, the capacitance element being connected between terminals of the storage cell; and an open-detection section that determines the presence of an open circuit in a line which connects the storage cell and the corresponding capacitance element, the determination being performed based on change of the voltage during the period which is applied to the capacitance element.

Another aspect of the invention is the balancing device, wherein, if the time rate of change of the voltage, during the period, which is applied to the capacitance element exceeds a certain threshold, the open-detection section determines the presence of an open circuit in a line which connects the storage cell and the corresponding capacitance element.

Still another aspect of the invention is the balancing device, wherein the balancing device further comprises: an inductor whose one end is connected to a junction point between a first one and a second one of the electrical storage modules that are connected in series; a first switching element that is connected in series together with the inductor between positive and negative terminals of the first electrical storage module; a second switching element that is connected in series together with the inductor between positive and negative terminals of the second electrical storage module, and the switching control section equalizes voltages between the electrical storage modules by transferring electric power between the electrical storage modules through the inductor, the transferring being realized by controls on-off states of the first switching element and the second switching element so that the first switching element and the second switching element are always in different on-off state from each other.

A further aspect of the invention is the balancing device, wherein the third switching device and the second switching element are composed of a Metal-Oxide-Semiconductor Field-Effect Transistor (MOSFET), and the capacitance element is substituted by stray capacitance that exists in either one of the first switching device and the second switching element.

A further aspect of the invention is the balancing device, wherein the balancing device further comprises: a transformer including a primary winding that is connected between positive and negative terminals of a battery composed of a plurality of the series-connected electrical storage modules, and a plurality of secondary windings that are connected between positive and negative terminals of each of the electrical storage modules; a switching element that is connected in series with the battery in a path including the battery and the primary winding, and the switching control section equalizes voltages between the electrical storage modules by transferring electric power between the electrical storage modules through the transformer, the transferring being performed by on-off control of the switching element.

A further aspect of the invention is an electrical storage device including the plurality of series-connected storage cells and the balancing device.

The problems and solutions of the present invention will become clear through Description of Embodiments and the accompanying drawings.

Advantageous Effects of Invention

The invention realizes a device having a simple configuration which is capable of surely detecting an open circuit in the circuit.

DESCRIPTION OF EMBODIMENTS

The embodiment of the invention will be described below. In the description below, the same or similar items will be indicated by the same symbols and duplicate descriptions will be often omitted.

Figure 1:
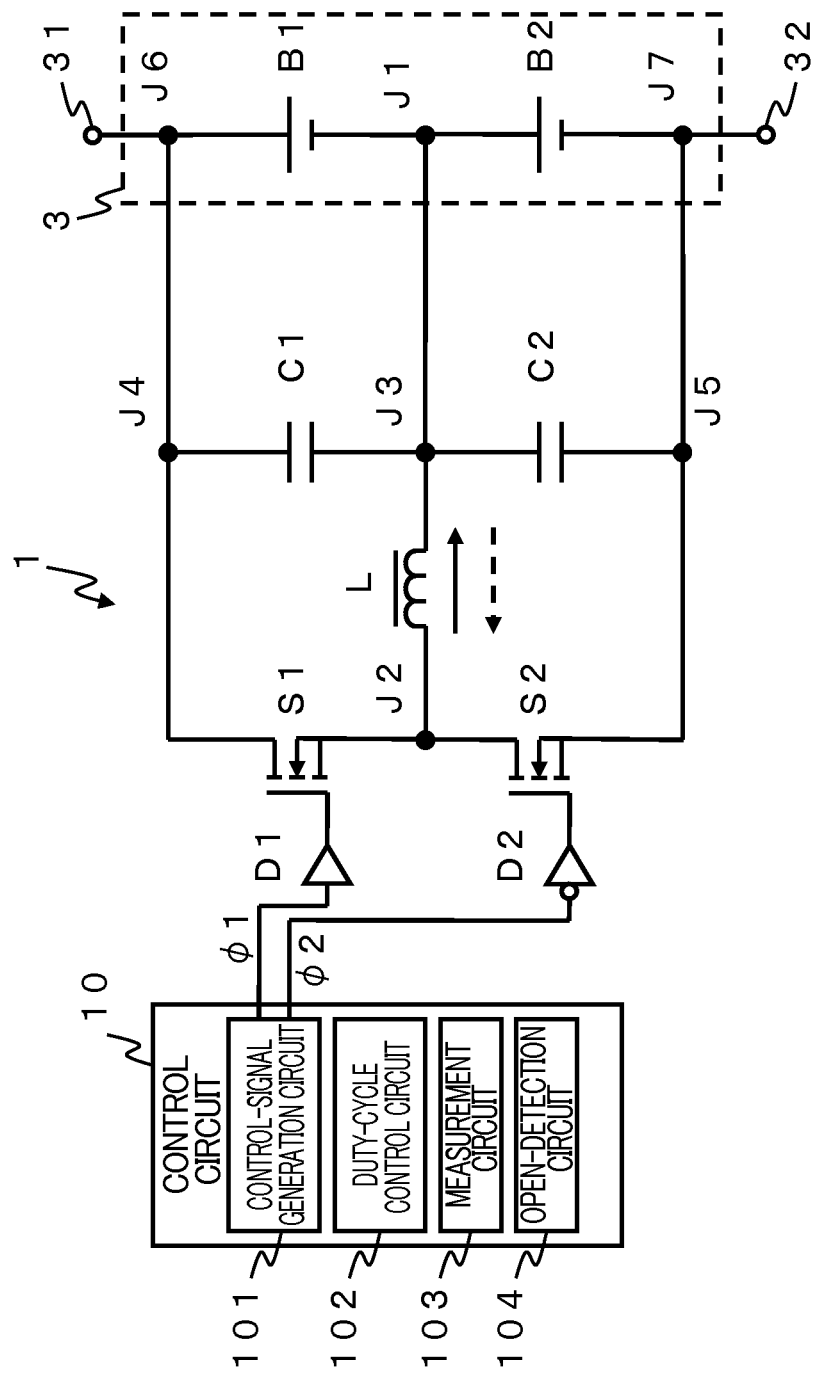
FIG. 1 shows an example of a converter-type balancing circuit 1.

FIG. 1 is a balancing circuit 1 (balancing device) according to an embodiment of the invention. The balancing circuit 1 is applied to an apparatus such as an electrical storage device in which a battery composed of a plurality of series-connected storage cells is used (e.g. an electric car, a hybrid vehicle, an electric bike, a railroad car, an elevator, a grid-connected electrical storage device, a personal computer, a notebook computer, a mobile phone, a smartphone, a PDA device). The typical storage cells are exemplified by a lithium-ion secondary battery and a lithium-ion polymer battery. The storage cells may be other types of rechargeable elements such as an electrical double-layer capacitor.

In a battery composed of storage cells whose product quality and degradation are different, battery characteristics (e.g. battery capacity, discharge voltage characteristic) may be different between the storage cells. The difference in the foregoing battery characteristics may cause variation in the voltages between storage cells at the time of charging and discharging. In order to prevent the occurrence of such a variation, the balancing circuit 1 operates so as to equalize the voltages (to ensure cell balance) between storage cells or between electrical storage modules composed of a plurality of series-connected storage cells.

As shown in FIG. 1, a battery 3 is composed of storage cells B1 and B2 which are connected in series. To each of the positive and negative terminals 31 and 32 of the battery 3, any of the follow items is connected: a current source which supplies charging current to the battery 3 (e.g. a charger, a power-regenerative circuit) or a load which uses electromotive force of the battery 3 (e.g. a motor, customers' load, an electronic circuit).

To a line which connects the negative electrode of the storage cell B1 and the positive electrode of the storage cell B2, one end of the inductor L is connected. On a line which connects the other end of the inductor L and the positive electrode of the storage cell B1, a switching element S1 is included. On a line which connects the other end of the inductor L and the negative electrode of the storage cell B2, a switching element S2 is included.

The switching elements S1 and S2 are composed of Metal-Oxide-Semiconductor Field-Effect Transistors (MOSFETs). The switching elements S1 and S2 operate according to gate drivers D1 and D2 in a complementary manner such that one of the switching elements is OFF when the other switching element is ON, the gate drivers D1 and D2 being controlled by control signals φ1 and φ2 which are generated by a control circuit 10 (switching control section).

A capacitance element C1 is placed between one end of the inductor L and the positive electrode of the storage cell B1, and a capacitance element C2 is placed between one end of the inductor L and the negative electrode of the storage cell B2. The capacitance elements C1 and C2 is provided for the following purposes: reducing noise which is caused by on-off operation of the switching element; dampening voltage change which occurs in the storage cells B1 and B2 due to switching; or the like. If the switching elements S1 and S2 are composed of MOSFETs, the capacitance elements C1 and C2 may be substituted by the stray capacitance of the switching elements S1 and S2. Additionally, the capacitance element C1 may be placed between a junction point J4 and a junction point J5 (the terminals of the capacitance element C1 may be connected to the junction point J4 and the junction point J5 respectively).

As shown in FIG. 1, the control circuit 10 includes: a control-signal generation circuit 101; a duty-cycle control circuit 102; a measurement circuit 103 (voltage measurement section); and an open-detection circuit 104 (open-detection section).

The control-signal generation circuit 101 generates the control signals φ1 and φ2 of two phases; the control signals are supplied to the gate drivers D1 and D2 respectively. In the present embodiment, the control signals φ1 and φ2 are square waves (e.g. Pulse Width Modulation pulses: PWM pulses) of two phases with a certain duty cycle (e.g. 50%).

The duty-cycle control circuit 102 controls the duty cycle of the control signals φ1 and φ2 which are generated by the control-signal generation circuit 101. The measurement circuit 103 acquires in real time measurements of the voltage and measurements of the current at a certain point on a line constituting the balancing circuit 1.

The open-detection circuit 104 detects the presence of an open circuit in the lines constituting the balancing circuit 1, and the detection is performed based on the time rate of change of voltage (voltage change per unit time) at certain points of the lines during a second period. For example, the open-detection circuit 104 detects the presence of an open circuit in the lines which connect the capacitance elements C1 and C2 and the storage cells B1 and B2, and the detection is performed based on whether the time rate of change of voltage (voltage change of per unit time) which is applied between the terminals of the capacitance element C1 exceeds a certain threshold and whether the time rate of change of voltage which is applied between the terminals of the capacitance element 02 exceeds a certain threshold.

The basic operations of the balancing circuit 1 will be described with reference to FIG. 2.

Figure 2:
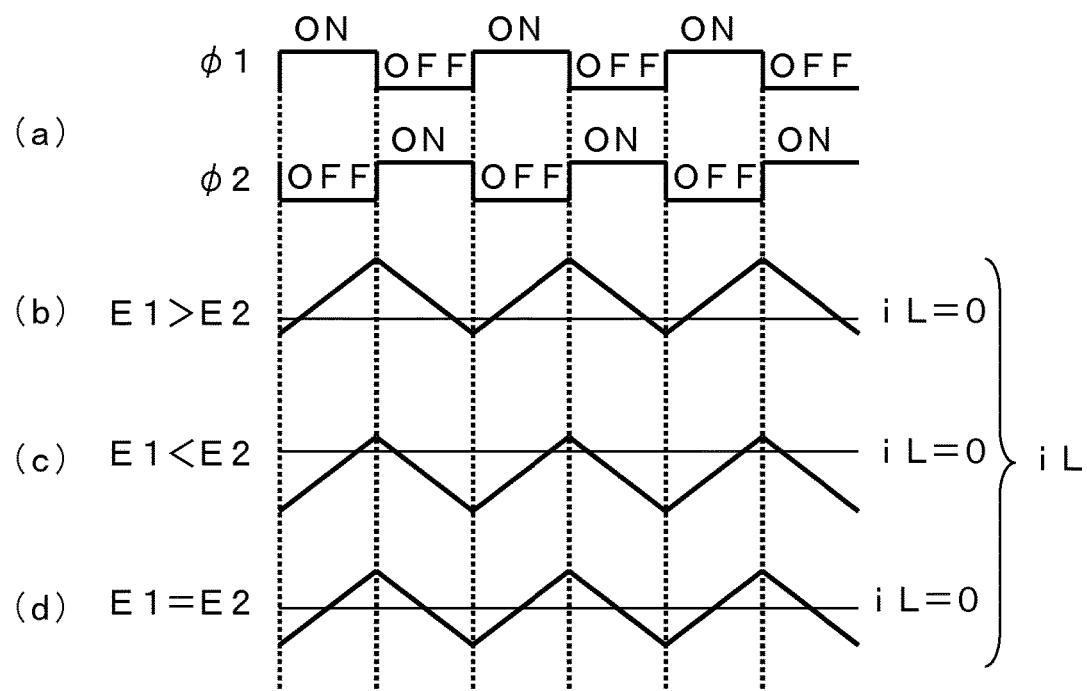
FIG. 2 is a graph illustrating the operation of the balancing circuit 1. Profile (a) of FIG. 2 shows the waveforms of control signals φ1 and φ2 which are generated by a control circuit 10 during a first period, and Profiles (b) to (d) of FIG. 2 show the waveforms of a current which flows in an inductor L during the first period.

Profile (a) of FIG. 2 shows the waveforms of the control signals φ1 and φ2 which are generated by the control circuit 10 during a period of on-off control of the switching elements S1 and S2. As shown in Profile (a) of FIG. 2, during the period, the control circuit 10 generates the control signals φ1 and φ2 consisting of, for example, square waves which turn ON and OFF with the same period in a complementary manner.

Profiles (b) to (d) of FIG. 2 shows the waveforms of current iL which flows in the inductor L during a period of on-off control of the switching elements S1 and S2. Profile (b) of FIG. 2 shows waveforms of current iL which flows in the inductor L when the voltage E1 of the storage cell B1 is greater than the voltage E2 of the storage cell B2. Profile (c) of FIG. 2 shows the waveforms of current iL which flows in the inductor L when the voltage E1 of the storage cell B1 is smaller than the voltage E2 of the storage cell 32. Profile (d) of FIG. 2 shows the waveforms of current iL which flows in the inductor L when the voltage E1 of the storage cell B1 is (substantially) equal to the voltage E2 of the storage cell B2.

As shown in Profile (b) of FIG. 2, if the voltage E1 of the storage cell B1 is greater than the voltage E2 of the storage cell B2 (E1>E2), most of the current iL flows through the following path (hereinafter referred to as a first path) during a period in which the switching element S1 is ON and the switching element S2 is OFF: the positive electrode of the storage cell B1→a junction point J6→the junction point J4→the switching element S1→the inductor L→a junction point J3→a junction point J1→the negative electrode of the storage cell B1. That is, during this period, most of the current iL flows in a direction indicated by the solid arrow of FIG. 1 and energy is stored in the inductor L.

Subsequently, when the switching element S1 turns OFF and the switching element S2 turns ON, the energy stored in the inductor L is desorbed through the following path: the inductor L→the junction point J3→the junction point J1→the positive electrode of the storage cell B2→the negative electrode of the storage cell B2→a junction point J7→the junction point J5→the switching element S2→the inductor L. The storage cell 32 is thus charged. When there is no energy in the inductor L, the current iL which flows in the inductor L reverses.

On the other hand, as shown in Profile (c) of FIG. 2, if the voltage E1 of the storage cell B1 is smaller than the voltage E2 of the storage cell 32 (E1<E2), most of the current iL flows through the following path (hereinafter referred to as a second path) during a period in which the switching element S1 is OFF and the switching element S2 is ON: the positive electrode of the storage cell B2→the junction point J1→the junction point J3→the inductor L→a junction point J2→the switching element S2→the junction point J5→the junction point J7→the negative electrode of the storage cell 32. That is, during this period, most of the current iL flows in a direction indicated by the dashed arrow of FIG. 1 and energy is stored in the inductor L.

Subsequently, when the switching element S2 turns OFF and the switching element S1 turns ON, the energy stored in the inductor L is desorbed through the following path: the inductor L→the junction point J2→the switching element S1→the junction point J4→the junction point J6→the positive electrode of the storage cell B1→the negative electrode of the storage cell B1→the junction point J1→the junction point J3→the inductor L. The storage cell B1 is thus charged. When there is no energy in the inductor L, the current iL which flows in the inductor L reverses.

If there is the difference in voltage between the storage cell B1 and the storage cell B2, energy is transferred between the storage cells B1 and B2 by the foregoing alternate flows of the current iL through the first path and the second path. As a result, the voltages of both cells are equalized to ensure cell balance. As shown in Profile (d) of FIG. 2, if the voltage E1 of the storage cell B1 is equal to the voltage E2 of the storage cell B2 (E1=E2), energy which is transferred between the storage cells B1 and B2 according to on-off control is in equilibrium, and the voltages between the storage cells B1 and B2 are maintained equal.

The control circuit 10 monitors in real time voltages measured by the measurement circuit 103, that is, the voltage between the terminals of each of the storage cells B1 and B2 (e.g. voltage between the junction points 34 and J3, and the voltage between the junction points J3 and J5). When the control circuit 10 notices that the voltages of the storage cells B1 and B2 are equal (substantially the same), the control circuit 10 stops on-off control of the switching elements S1 and S2.

<Open-Circuit Detection>

The mechanism for detecting an open circuit of the balancing circuit 1 according to the present embodiment will be described below. When the control circuit 10 determines that it is necessary to ensure cell balance between the storage cells B1 and B2, the control circuit 10 equalizes the voltages between the storage cells B1 and B2 as follows: on-off control of the switching elements S1 and S2 is performed by generating the control signals φ1 and φ2 with a first duty cycle (e.g. 50%) and transferring electric power between the storage cells B1 and B2.

On the other hand, in order to detect an open circuit in the lines, the control circuit 10 introduces, subsequent to the foregoing period on-off control (hereinafter referred to as a first period), another period (hereinafter referred to as a second period) and alternates these periods at predetermined intervals; in the other period, the control signals φ1 and φ2 with a second duty cycle (e.g. 70-90%) which is different from the first duty cycle are generated. The control circuit 10 introduces the second period, for example, at time intervals and with a length of the period which do not affect the cell balancing by the balancing circuit 1.

Figure 3:
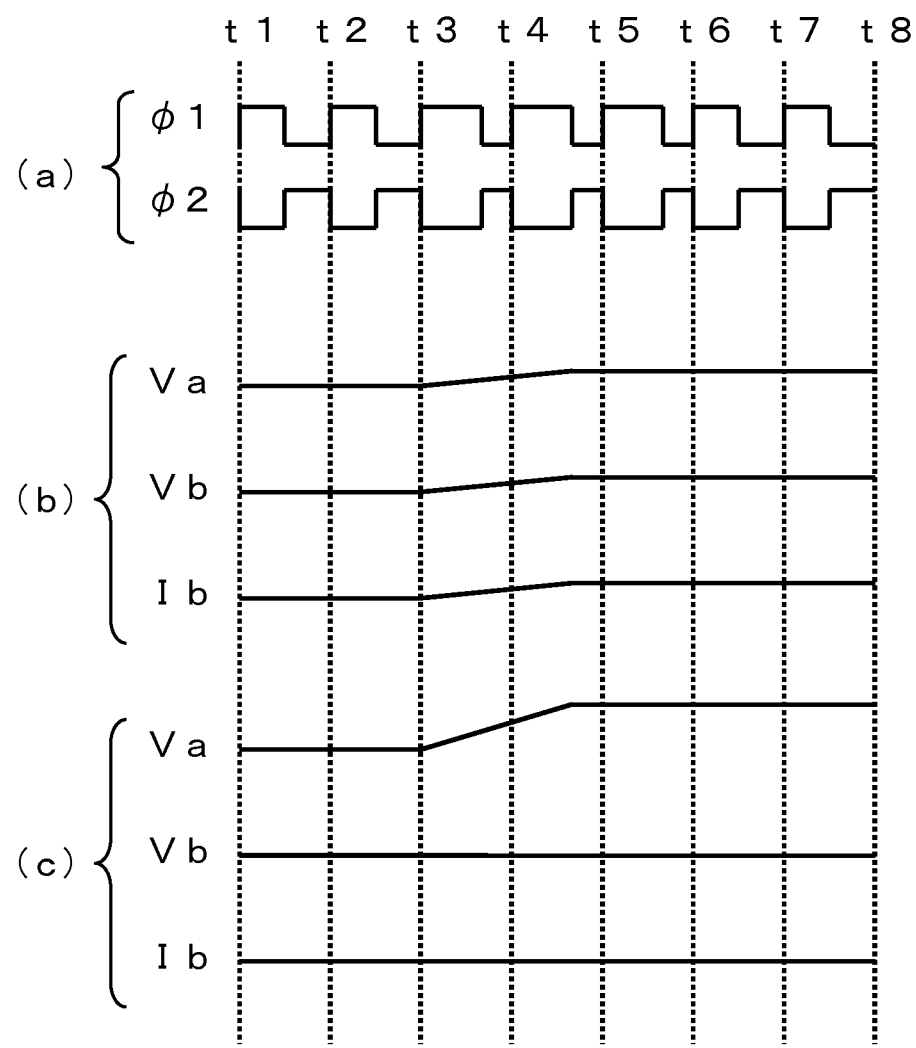
FIG. 3 is a drawing illustrating open-line detection by the balancing circuit 1. Profile (a) of FIG. 3 shows the waveforms of the control signals φ1 and φ2 during a second period. Graph (b) of FIG. 3 is a graph showing change of the voltage and the current at a certain point of the balancing circuit 1 when an open circuit does not occur. Graph (c) of FIG. 3 is a graph showing change of the voltage and the current at a certain point of the balancing circuit 1 when an open circuit occurs.
Figure 4:
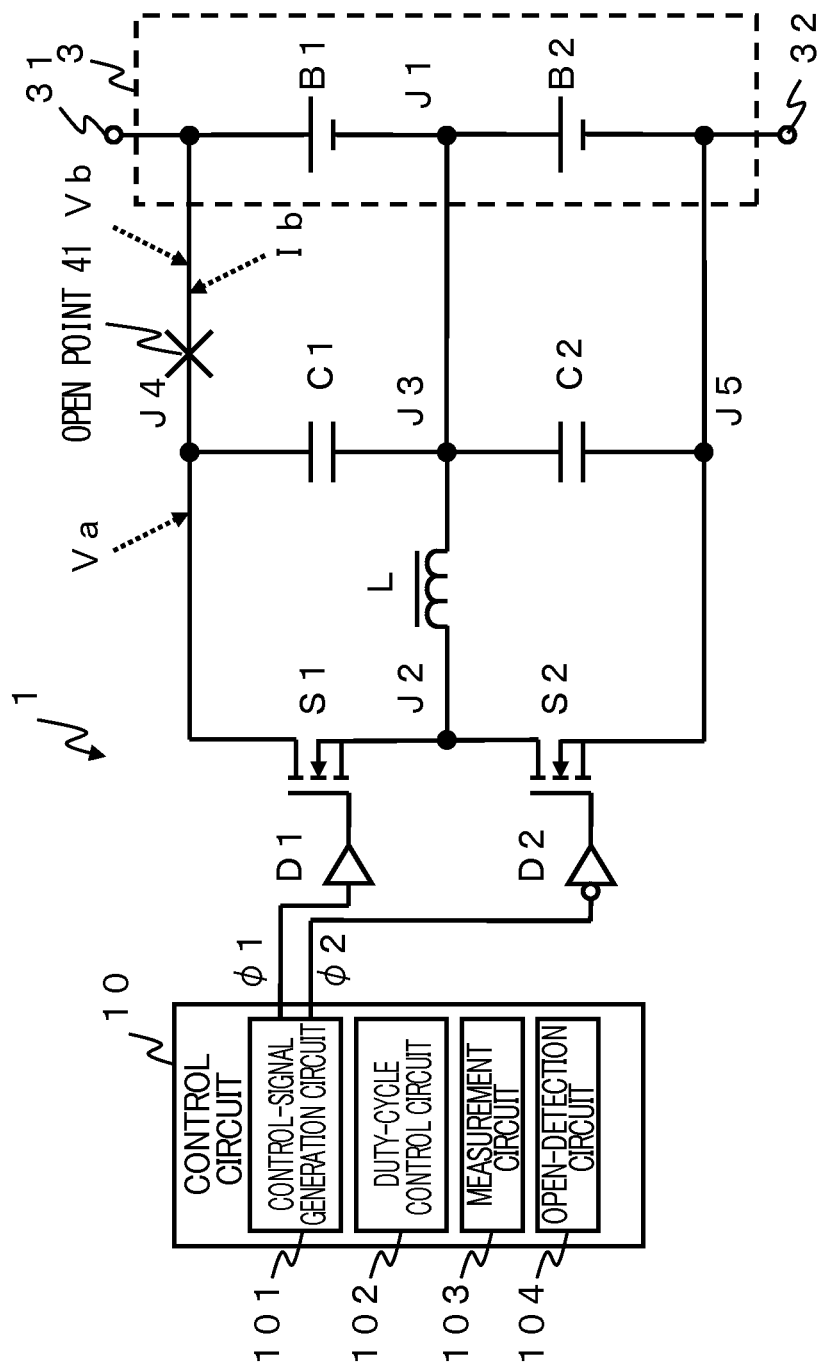
FIG. 4 is a diagram showing an open point 41.

Profile (a) of FIG. 3 shows an example of the control signals φ1 and φ2 generated by the control circuit 10 during the first period and the second period. In Profile (a) of FIG. 3, the period from time t1 to t3 corresponds to the first period, and the period from time t3 to t6 corresponds to the second period. During the second period, depending on the presence of an open circuit in any line of the balancing circuit 1, there is noticeable difference in the time rate of change of voltage applied between terminals, the terminals are those of the capacitance element C1 and those of the capacitance element C2. Below, the case in which an open circuit occurs at an open point 41 shown in FIG. 4 (a certain point of a line which connects the junction point J4 of the balancing circuit 1 and the positive electrode of the storage cell B1) will be described as an example.

Graph (b) of FIG. 3 is a graph whose time axis is the same as Profile (a) of FIG. 3 and shows change of the voltage and the current at a certain point of the balancing circuit 1 when an open circuit does not occur in the balancing circuit 1, the voltage and the current being measured by the measurement circuit 103. In Graph (b) of FIG. 3, the symbol Va indicates the voltage of the line connecting towards the switching element S1 from the open point 41 (the voltage of the terminal of the capacitance element C1, which connects to the positive electrode of the storage cell B1) (See FIG. 4); the symbol Vb indicates the voltage of the line connecting to the positive electrode of the storage cell B1 from the open point 41; and the symbol Ib indicates the current which flows in the line connecting to the positive electrode of the storage cell B1 from the open point 41 (to be described later). The reference potentials for measuring the voltages Va and Vb are the voltages at the junction point J3 and the junction point J5, for example.

As shown in Graph (b) of FIG. 3, if an open circuit does not occur in the balancing circuit 1, the voltages Va and Vb and the current Ib all gradually increase with time during the second period.

Graph (c) of FIG. 3 is a graph whose time axis is the same as Profile (a) of FIG. 3 and shows change of Va, Vb and Ib with time when an open circuit occurs at the open point 41. As shown in Graph (c) of FIG. 3, if an open circuit occurs at the open point 41, current does not flow in the line which connects the junction point J4 and the positive electrode of the storage cell B1, and the values Vb and Ib are both constant. But, current flows into the capacitance element C1 as a result of switching operation, and the value Va rapidly increases (in particular, during the period from time t3 to t5 in Graph (c) of FIG. 3).

Thus, examining whether the time rate of change of the voltage Va during the second period exceeds a certain threshold makes it possible to surely detect the presence of an open circuit in the line which connects the junction point 34 and the positive electrode of the storage cell B1. The same mechanism can be applied for detecting an open circuit in the line which connects the junction point 35 and the negative electrode of the storage cell B2, and for detecting an open circuit in the line which connects junction point 33 and the positive electrode of the storage cell B2.

As mentioned above, the balancing circuit 1 having the simple configuration according to the present embodiment makes it possible to surely detect an open circuit in the circuit. It should be noted that such a change of the duty cycle in the middle of switching operation does not cause extreme increase and extreme decrease of the voltage of the storage cells B1 and B2 because of an overcharge monitoring control mechanism or overdischarge monitoring control mechanism included in a common balancing device.

The above-described embodiment is merely for facilitating the understanding of the invention, but is not meant to be interpreted in a manner limiting the scope of the invention. The invention can of course be altered and improved as in the following description, for example, without departing from the gist thereof and includes functional equivalents.

For example, though the second duty cycle is greater than the first duty cycle in the foregoing embodiment, the second duty cycle may be smaller than the first duty cycle. In this case, it is sufficient to determine the presence of an open circuit by noticing the rapid decrease of the value Va, the rapid decrease being caused if an open circuit occurs at the open point 41 shown in FIG. 4, for example.

As for the measurement circuit 103, an existing voltage sensor or an existing current sensor which are for detecting cell balance (difference of voltage) of storage cells or cell modules may be used. Accordingly, the balancing circuit 1 according to the present embodiment can be achieved in a simple and cost-reducing manner.

A balancing circuit according to the invention may be separated from the storage cells, or may constitute a battery pack as a single piece with the storage cells.

Whereas the converter-type balancing circuit 1 is described as an example in the foregoing embodiment, the invention may be applied to a transformer-type balancing circuit.

Figure 5:
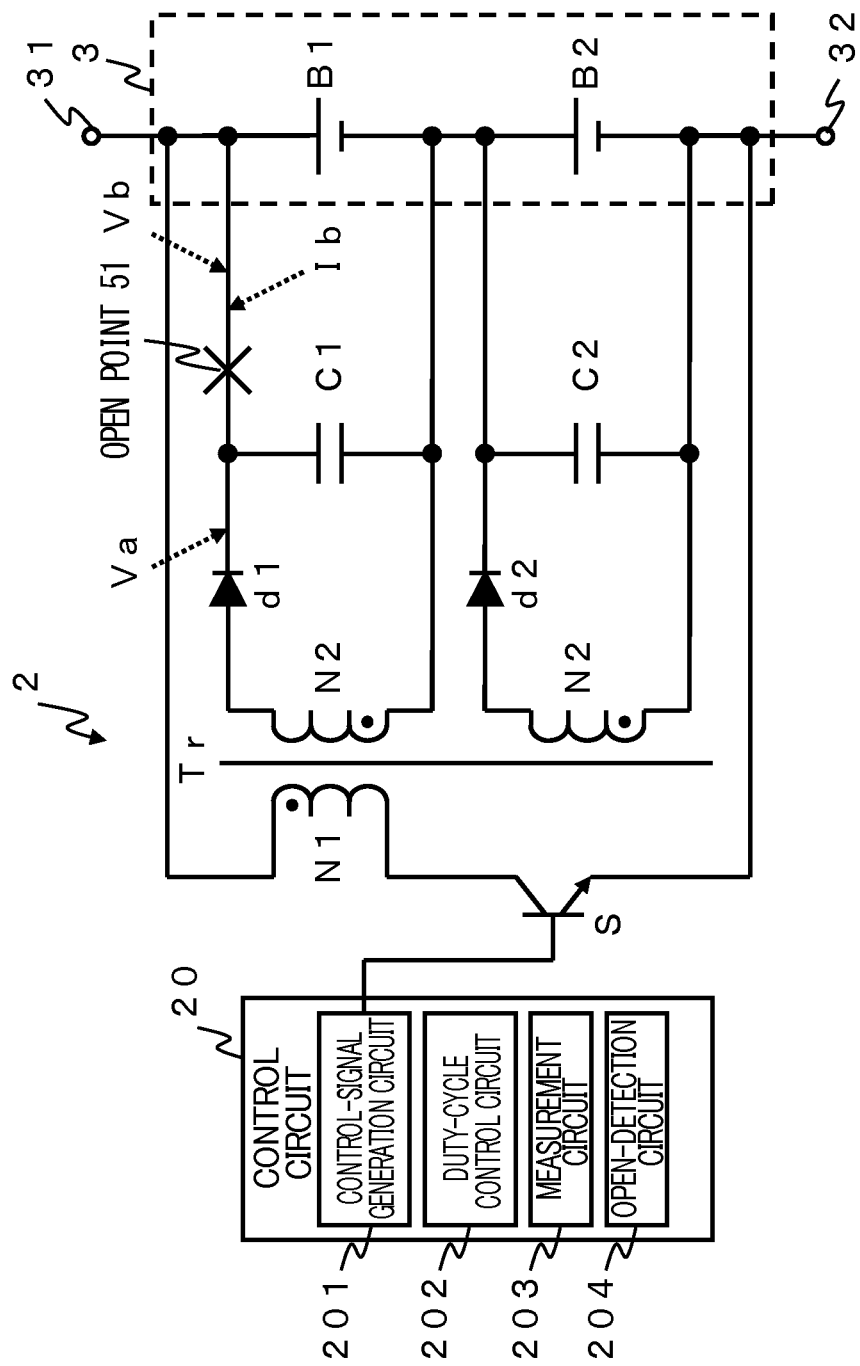
FIG. 5 is a diagram showing an example of a transformer-type balancing circuit 2.
Figure 6:
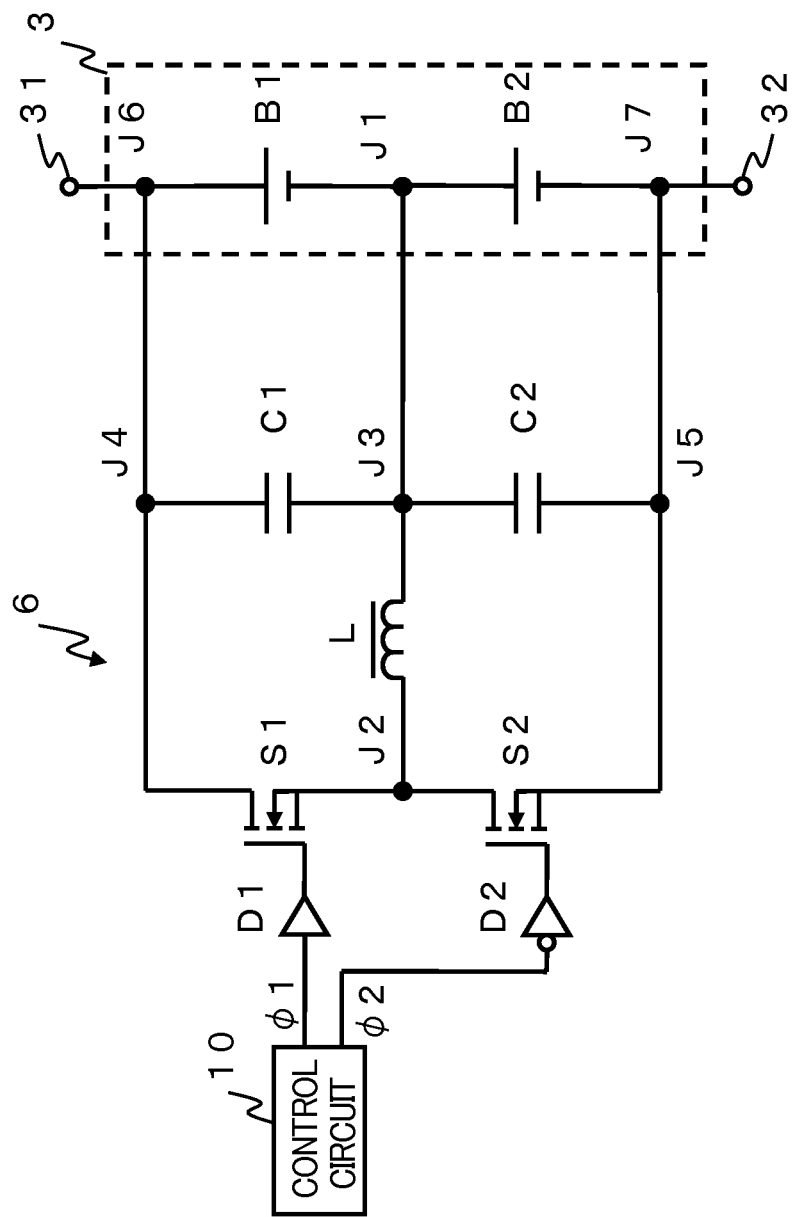
FIG. 6 is a diagram showing an example of a converter-type balancing circuit 6.
Figure 7:
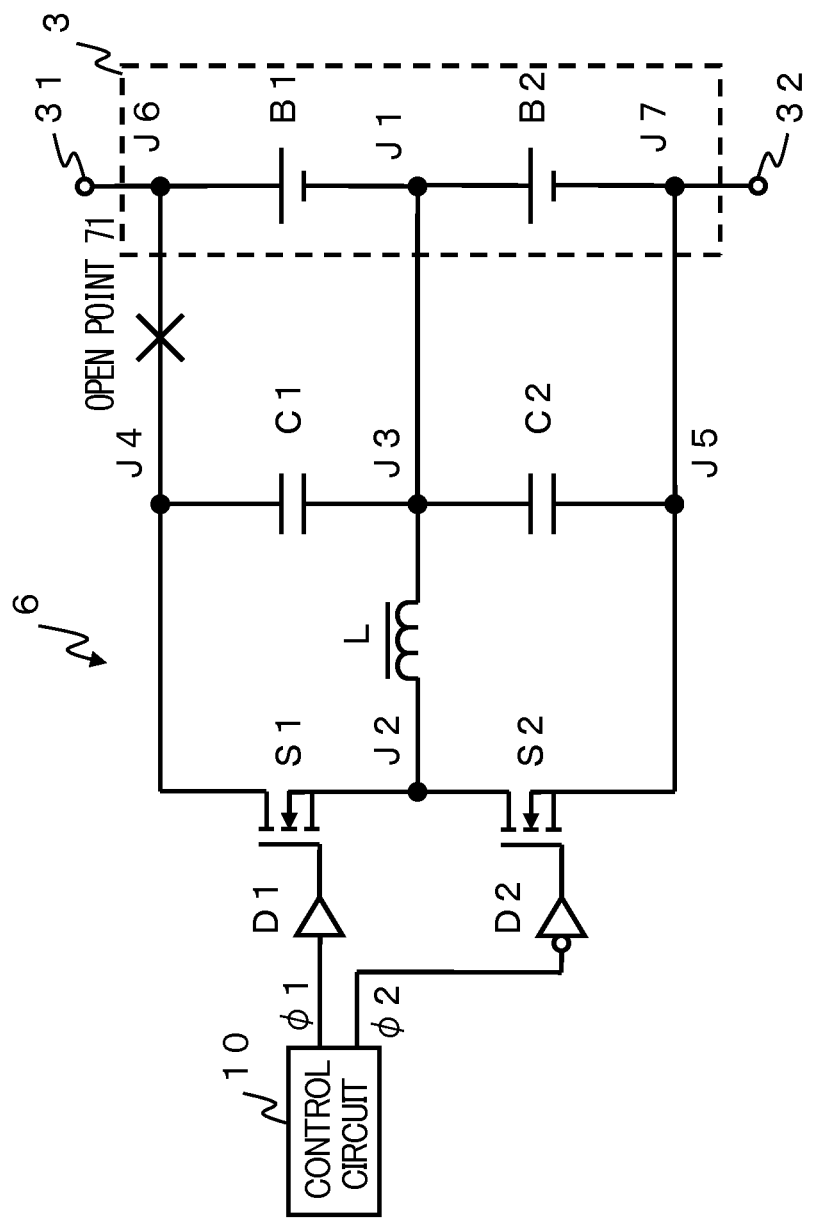
FIG. 7 is a diagram showing an open point 71.

FIG. 5 is a diagram showing an example of a transformer-type balancing circuit 2 according to the invention. As shown in FIG. 5, the battery 3 is composed of a storage cell B1 and a storage cell B2 which are connected in series. Between the positive and negative terminals of the battery 3, a source of charging current or load is connected. A primary winding N1 of a transformer Tr and a switching element S are connected between the positive and negative terminals of the battery 3. Secondary windings N2 of the transformer Tr are connected between the positive and negative terminals of the storage cells B1 and B2 respectively.

On the paths which are constituted by each of the storage cells B1 and B2 and the corresponding secondary windings N2 connecting between the positive and negative terminals of the storage cell, rectifying elements d1 and d2 are provided respectively. A capacitance element C1 is connected between the positive and negative terminals of the storage cell B1, and a capacitance element C2 is connected between the positive and negative terminals of the storage cell B2. The capacitance elements C1 and C2 are provided for the following purposes: reducing noise which is caused by the transformer Tr or elements; dampening voltage change which occurs in the storage cells B1 and B2; or the like.

On-off states of the switching element S is controlled according to control signals generated by a control circuit 20. As with the foregoing the control circuit 10, the control circuit 20 includes: a control-signal generation circuit 201; a duty-cycle control circuit 202; a measurement circuit 203; and an open-detection circuit 204.

The control-signal generation circuit 201 generates control signals which are for controlling on-off states of the switching element S. The switching element S is composed of, for example, a MOSFET or a bipolar transistor. In the switching element S composed of a bipolar transistor, the control signals are input to a base. In the switching element S composed of a MOSFET, the control signals are input to a gate.

In the balancing circuit 2, electric power of the battery 3 composed of the series-connected storage cells B1 and B2 is redistributed from the primary winding N1 to the secondary windings N2, and voltages are equalized between the storage cells B1 and B2.

As with the foregoing converter-type circuit, the presence of an open circuit at an open point 51 shown in FIG. 5 is determined by examining whether the time rate of change of the value Va during the second period exceeds a certain threshold. Additionally, as with the foregoing converter-type circuit, it is possible to determine the presence of an open circuit in the following lines: the line which connects the capacitance element C1 and the negative electrode of the storage cell B1; the line which connects capacitance element C2 and the positive electrode of the storage cell B2; and the line which connects capacitance element C2 and the negative electrode of the storage cell B2.

REFERENCE SIGNS LIST

1 balancing circuit, 10 control circuit, 41 open point, 101 control-signal generation circuit, 102 duty-cycle control circuit, 103 measurement circuit, 104 open-detection circuit, L inductor, C1, C2 capacitance element, B1, B2 storage cell, S1, S2 the switching element

The invention claimed is:

1. A balancing device that equalizes voltages between storage cells of a battery composed of a plurality of series-connected storage cells or voltages between electrical storage modules composed of a plurality of series-connected storage cells of the battery, the balancing device comprising:
  a switching control section that equalizes voltages between the electrical storage modules by transferring electric power between the electrical storage modules through an element to which all of the electrical storage modules are connected, the transferring being realized by on-off control of current supply to each of the electrical storage modules, the on-off control being performed with a first duty cycle;
  a duty-cycle control section that introduces a period in which the on-off control is performed with a second duty cycle, the second duty cycle being different from the first duty cycle;
  a voltage measurement section that measures a voltage applied to a capacitance element, the capacitance element being connected between terminals of the storage cell; and
  an open-detection section that determines the presence of an open circuit in a line which connects the storage cell and the corresponding capacitance element,
    the determination being performed based on change of the voltage during the period which is applied to the capacitance element.

2. A balancing device according to claim 1, wherein if the time rate of change of the voltage, during the period, which is applied to the capacitance element exceeds a certain threshold, the open-detection section determines the presence of an open circuit in a line which connects the storage cell and the corresponding capacitance element.

3. A balancing device according to claim 1, wherein the balancing device further comprises:
  an inductor whose one end is connected to a junction point between a first one and a second one of the electrical storage modules that are connected in series;
  a first switching element that is connected in series together with the inductor between positive and negative terminals of the first electrical storage module;
  a second switching element that is connected in series together with the inductor between positive and negative terminals of the second electrical storage module, and
  the switching control section equalizes voltages between the electrical storage modules by transferring electric power between the electrical storage modules through the inductor, the transferring being realized by controls on-off states of the first switching element and the second switching element so that the first switching element and the second switching element are always in different on-off state from each other.

4. A balancing device according to claim 3, wherein
the first switching element and the second switching element are composed of a Metal-Oxide-Semiconductor Field-Effect Transistor (MOSFET), and
the capacitance element is substituted by stray capacitance that exists in either one of the first switching element and the second switching element.

5. A balancing device according to claim 1, wherein
the balancing device further comprises:
   a transformer including
      a primary winding that is connected between positive and negative terminals of a battery composed of a plurality of the series-connected electrical storage modules, and
      a plurality of secondary windings that are connected between positive and negative terminals of each of the electrical storage modules;
   a switching element that is connected in series with the battery in a path including the battery and the primary winding, and
the switching control section equalizes voltages between the electrical storage modules by transferring electric power between the electrical storage modules through the transformer, the transferring being performed by on-off control of the switching element.

6. An electrical storage device, comprising:
the plurality of storage cells; and
the balancing device according to claim 1.

* * * * *